(12) United States Patent
Sung et al.

(10) Patent No.: US 9,094,662 B2
(45) Date of Patent: Jul. 28, 2015

(54) ENCODER AND DECODER TO ENCODE SIGNAL INTO A SCALABLE CODEC AND TO DECODE SCALABLE CODEC, AND ENCODING AND DECODING METHODS OF ENCODING SIGNAL INTO SCALABLE CODEC AND DECODING THE SCALABLE CODEC

(75) Inventors: Hosang Sung, Yongin-si (KR); Eunmi Oh, Seongnam-si (KR); Junghoe Kim, Seoul (KR); Kangeun Lee, Gangneung-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 315 days.

(21) Appl. No.: 11/709,254

(22) Filed: Feb. 22, 2007

(65) Prior Publication Data

US 2007/0291835 A1    Dec. 20, 2007

(30) Foreign Application Priority Data

Jun. 16, 2006  (KR) .................. 10-2006-0054374

(51) Int. Cl.
*G10L 19/02* (2013.01)
*H04N 19/164* (2014.01)
(Continued)

(52) U.S. Cl.
CPC .......... *H04N 19/00236* (2013.01); *G10L 19/24* (2013.01); *H04N 19/115* (2014.11); *H04N 19/164* (2014.11); *H04N 19/187* (2014.11); *H04N 19/30* (2014.11); *H04N 21/234327* (2013.01); *H04N 21/2402* (2013.01); *H04N 21/2662* (2013.01); *H04N 21/6437* (2013.01)

(58) Field of Classification Search
CPC .................. H04N 19/00781; H04N 19/00472; H04W 28/04; H04W 28/24; H04W 52/34; H04W 72/08; H04W 84/04; G10L 19/0017; G10L 19/008; G10L 19/167; G10L 19/24
USPC .......... 704/229, E19.004, E19.044, 500–504, 704/222, 201, 230, 205; 725/110, 80, 87, 725/94; 375/240.12, 240.1, 240.19, 240.03, 375/240.11, 240.16, 240.02
See application file for complete search history.

(56) References Cited

U.S. PATENT DOCUMENTS 6,016,111 A    1/2000  Park et al.
6,122,618 A    9/2000  Park
(Continued)

FOREIGN PATENT DOCUMENTS

KR    10-0319916    12/2001
KR    20040025994    3/2004
(Continued)

OTHER PUBLICATIONS

Lee et al. "A real-time audio streaming method for time-varying network loads" AES 112th Convention. May 2002.*
(Continued)

*Primary Examiner* — Vijay B Chawan
(74) *Attorney, Agent, or Firm* — Staas & Halsey LLP

(57) ABSTRACT

An encoder and decoder to encode one or more input signals into a scalable codec and to decode the scalable codec, and encoding and decoding methods using a bitstream with a layered structure in the scalable codec change a top coding bit rate to encode the input signals according to a network status, and the bitstream is decoded by analyzing the top coding bit rate included in the bitstream.

28 Claims, 10 Drawing Sheets

(51) Int. Cl.
*G10L 19/24* (2013.01)
*H04N 21/2343* (2011.01)
*H04N 21/24* (2011.01)
*H04N 21/2662* (2011.01)
*H04N 21/6437* (2011.01)
*H04N 19/30* (2014.01)
*H04N 19/115* (2014.01)
*H04N 19/187* (2014.01)

(56) References Cited

U.S. PATENT DOCUMENTS

| | | | |
|---|---|---|---|
| 6,148,288 | A | 11/2000 | Park |
| 6,446,037 | B1 | 9/2002 | Fielder et al. |
| 6,999,432 | B2 * | 2/2006 | Zhang et al. ............... 370/328 |
| 7,561,933 | B2 * | 7/2009 | Oh et al. .................... 700/94 |
| 7,689,427 | B2 * | 3/2010 | Vasilache .................... 704/500 |
| 7,831,436 | B2 * | 11/2010 | Kim et al. .................... 704/501 |
| 7,835,915 | B2 * | 11/2010 | Kim et al. .................... 704/500 |
| 7,921,446 | B2 * | 4/2011 | Krikorian et al. ............... 725/94 |
| 8,265,929 | B2 | 9/2012 | Lee et al. |
| 2003/0083870 | A1 * | 5/2003 | Lee et al. .................... 704/229 |
| 2004/0176948 | A1 * | 9/2004 | Oh et al. .................... 704/201 |
| 2004/0181394 | A1 * | 9/2004 | Kim et al. .................... 704/200.1 |
| 2004/0181395 | A1 * | 9/2004 | Kim et al. .................... 704/200.1 |
| 2005/0076136 | A1 | 4/2005 | Cho et al. |
| 2005/0129109 | A1 * | 6/2005 | Kim et al. ............... 375/240.01 |
| 2005/0246178 | A1 * | 11/2005 | Fejzo .......................... 704/500 |
| 2006/0013300 | A1 * | 1/2006 | Han .......................... 375/240.03 |
| 2006/0095471 | A1 * | 5/2006 | Krikorian et al. .......... 707/104.1 |
| 2006/0122830 | A1 | 6/2006 | Lee et al. |
| 2007/0010903 | A1 * | 1/2007 | Kim et al. .................... 700/94 |
| 2007/0165717 | A1 * | 7/2007 | Ye .......................... 375/240.16 |
| 2007/0230566 | A1 * | 10/2007 | Eleftheriadis et al. ..... 375/240.1 |
| 2008/0004883 | A1 * | 1/2008 | Vilermo et al. ............... 704/500 |
| 2008/0021712 | A1 * | 1/2008 | Fejzo .......................... 704/500 |
| 2008/0130757 | A1 * | 6/2008 | Trandel et al. ........... 375/240.25 |

FOREIGN PATENT DOCUMENTS

| | | |
|---|---|---|
| KR | 1020060064498 | 6/2006 |
| WO | WO 03/088602 | 10/2003 |
| WO | WO 2007035147 A1 * | 3/2007 |
| WO | 2007145431 | 12/2007 |

OTHER PUBLICATIONS

Choo et al. "Enhanced performance in the functionality of fine grain scalability" AES 119th Convention. Oct. 2005.*
Lee et al. "The MPEG-4 BSAC Audio Decoder Implementation in Terrestrial DMB Receiver" Jan. 7-11, 2006.*
Kim et al. "Fine grain scalability in MPEG-4 Audio" 2001.*
Park et al. "Multi-Layer Bit-Sliced Bit-Rate Scalable Audio Coding" 1997.*
A. Szwabe, A. Schorr, F. J. Hauck, and A. J. Kassler, "Dynamic multimedia stream adaptation and rate control for heterogeneous networks," in Proc. 15th International Packet Video Workshop, (PV'06), Hangzhou, China, May 2006, vol. 7, pp. 63-69.*
Korean Notice of Allowance dated Jul. 19, 2013 issued in KR Application No. 10-2010-0054374.
International Search Report and Written Opinion of the International Search Report mailed Sep. 7, 2007 from International Patent Application No. PCT/KR2007/002472, 12 pages.

* cited by examiner

ENCODER AND DECODER TO ENCODE SIGNAL INTO A SCALABLE CODEC AND TO DECODE SCALABLE CODEC, AND ENCODING AND DECODING METHODS OF ENCODING SIGNAL INTO SCALABLE CODEC AND DECODING THE SCALABLE CODEC

CROSS-REFERENCE TO RELATED APPLICATIONS

This application claims priority under 35 U.S.C. 119(a) from Korean Patent Application No. 10-2006-0054374, filed on 16 Jun. 2006, in the Korean Intellectual Property Office, the disclosure of which is incorporated herein in its entirety by reference.

BACKGROUND OF THE INVENTION

1. Field of the Invention

The present invention relates to a scalable codec system, and more particularly, to an encoder and decoder to encode a signal into a scalable codec and decode the scalable codec, and encoding and decoding methods of encoding a signal into a scalable codec and decoding the scalable codes using a bitstream with a layered structure of the scalable codec.

2. Description of the Related Art

A layered structure represents that a data section of a bitstream is formed of a plurality of layers according to the G.729EV standard or a bit sliced arithmetic coding (BSAC) scheme. In the G.729EV standard, a core layer contains a minimal set of necessary data, and an enhancement layer contains data for enhancing sound quality of the core layer and is divided into eleven layers, as illustrated in FIGS. 1A and 1B. When the bitstream with a layered structure is transmitted, lower layers may be truncated from the bitstream by a bitstream truncation module in terminals or networks and only remaining higher layers may be transmitted, as occasion demands.

When a communication is performed using the bitstream having the layered structure and a traffic on a network increases in various bottleneck situations as illustrated in FIGS. 1C to 1E, the communication does not operate smoothly. If a bottleneck occurs on the network, the bitstream truncation module truncates the lower layers from the received bitstream and transmits only the remaining higher layers.

Therefore, there is a problem in that encoders encoding input signals into the layered structure should redundantly encode the lower layers that might be truncated depending on the network status. In addition, since a top coding bit rate for encoding the input signals is fixed, there is a problem in that the encoding is not optimized independent of the network status and the sound quality is deteriorated accordingly.

SUMMARY OF THE INVENTION

The present general inventive concept provides an encoder and decoder to encode one or more input signals into a scalable codec and to decode the scalable codec, and encoding and decoding methods of encoding the input signals into the scalable codec and to decode the scalable codec, in which the input signals are encoded into a layered structure and a top coding bit rate for encoding the input signals is changed in accordance with a status of a network.

The present general inventive concept also provides an encoder and decoder to encode one or more input signals into a scalable codec and to decode the scalable codec, and encoding and decoding methods of encoding the input signals into the scalable codec and decoding the scalable codec, in which the input signals are encoded into a layered structure and a bitstream is decoded by analyzing a top coding bit rate included in the bitstream.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a method of encoding one or more input signals, the method comprising determining a top coding bit rate that is used to encode one or more input signals, and encoding input signals into layered structure as a scalable codec according to the determined top coding bit rate.

The foregoing and/or other aspects of the present general inventive concept may also be achieved by providing an encoding method of encoding input signals, the method comprising estimating a status of a network, determining a top coding bit rate to encode one or more input signals using the estimation status, and encoding the input signals into a layered structure as a scalable codec according to the determined top coding bit rate to generate a bitstream including a syntax representing the top coding bit rate.

The foregoing and/or other aspects of the present general inventive concept may also be achieved by providing a method of decoding a bitstream, the method comprising analyzing a top coding bit rate included in a bitstream, and decoding the bitstream encoded into a layered structure as a scalable codec according to the analyzed top coding bit rate.

The foregoing and/or other aspects of the present general inventive concept may also be achieved by providing a computer readable recording medium having recorded thereon a program to execute on a computer a method of encoding one or more input signals, the method comprising determining a top coding bit rate to encode the input signals, and encoding the input signals into a layered structure as a scalable codec according to the determined top coding bit rate.

The foregoing and/or other aspects of the present general inventive concept may also be achieved by providing a computer readable recording medium having recorded thereon a program to execute on a computer a method of encoding one or more input signals, the method comprising estimating a status of a network, determining a top coding bit rate to encode the input signals according to the estimated status of the network, and encoding the input signals into the layered structure as a scalable codec according to the determined top coding bit rate and generating a bitstream including a syntax representing the top coding bit rate.

The foregoing and/or other aspects of the present general inventive concept may also be achieved by providing a computer readable recording medium having recorded thereon a program to execute on a computer a method of decoding a bitstream, the method comprising analyzing a top coding bit rate included in a bitstream encoded in a layered structure, and decoding the bitstream according to the analyzed top coding bit rate.

The foregoing and/or other aspects of the present general inventive concept may also be achieved by providing an encoder to encode one or more input signals, the encoder comprising a transfer rate determining unit to determine a top coding bit rate to encode the input signals, and an encoding unit to encode the input signals into a layered structure as a scalable codec according to the determined top coding bit rate.

The foregoing and/or other aspects of the present general inventive concept may also be achieved by providing an encoder to encode one or more input signals, the encoder comprising a status estimating unit to estimate a status of a network, a determining unit to determine a top coding bit rate to encode the input signals using the estimated top coding bit rate, and a bitstream generating unit to encode the input signals into a layered structure as a scalable codec according to the determined top coding bit rate to generate a bitstream including a syntax representing the top coding bit rate.

The foregoing and/or other aspects of the present general inventive concept may also be achieved by providing a decoder to decode a bitstream, the decoder comprising an analyzing unit to analyze a top coding bit rate included in the bitstream, and a decoder to decode the bitstream encoded into a layered structure as a scalable codec according to the analyzed top coding bit rate.

The foregoing and/or other aspects of the present general inventive concept may also be achieved by providing a scalable codec system including an encoder to determine a top coding bit rate to encode one or more input signals, and to encode the input signals into a layered structure according to the determined top coding bit rate to generate a bitstream including a syntax representing the top coding bit rate, as a scalable codec, and a decoder to analyze the top coding bit rate included in the bitstream of the scalable codec, and to decode the bitstream according to the analyzed top coding bit rate.

The foregoing and/or other aspects of the present general inventive concept may also be achieved by providing a scalable codec system, including an encoder to determine a top coding bit rate to encode one or more input signals, and to encode the input signals into a layered structure according to the determined top coding bit rate to generate a bitstream including a syntax representing the top coding bit rate, as a scalable codec.

The layered structure may include a plurality of layers, and the top coding bit rte corresponds to a coding bit rate of a highest layer of the plurality of layers of the layered structure.

The layered structure may include a plurality of layers, and the number of the plurality of layers is determined according to the top coding bit rate.

The respective layers may include a highest layer having the determined top coding bit rate and lower layers having different fixed coding bit rates lower than the top coding bit rate.

The scalable codec system according to claim 29, wherein the top coding bit rate is determined according to a status of a network through which the bitstream is transmitted.

The respective layers may include a highest layer corresponding to the determined top coding bit rate and lower layers corresponding to different fixed coding bit rates lower than the top coding bit rate, and one or more lower layers are truncated according to the status of the network during the transmission of the bitstream to generate a second bitstream having a second layered structure as a second scalable codec.

The top coding bit rate may be a variable coding bit rate variable according to a status of a network through which the bitstream is transmitted.

The bitstream may include a header having at least one of a sync bit, a current rate, one or more bits for function control corresponding to a network, a bit for function control corresponding to the system, and a data section having a plurality of layers having a highest layer encoded according to the top coding bit rate.

The foregoing and/or other aspects of the present general inventive concept may also be achieved by providing a scalable codec system, including an encoder to determine a first top coding bit rate according to a first status of a network and a second top coding bit rate according to a second status of the network, to encode a first signal into a first layered structure according to the determined first top coding bit rate to generate a first bitstream as a first scalable codec, and to encode a second signal into a second layered structure according to the determined second top coding bit rate to generate a second bitstream as a second scalable codec.

The first layered structure may include a first number of layers having a first highest layer corresponding to the first top coding bit rate, and the second layered structure comprises a second number of layers having a second highest layer corresponding to the second top coding bit rate.

The first bitstream may include a first syntax representing the first top coding bit rate, and the second bitstream comprises a second syntax representing the second top coding bit rate.

The foregoing and/or other aspects of the present general inventive concept may also be achieved by providing a scalable codec system including a decoder to analyze a top coding bit rate included in a bitstream of a scalable codec, and to decode the bitstream according to the analyzed top coding bit rate.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
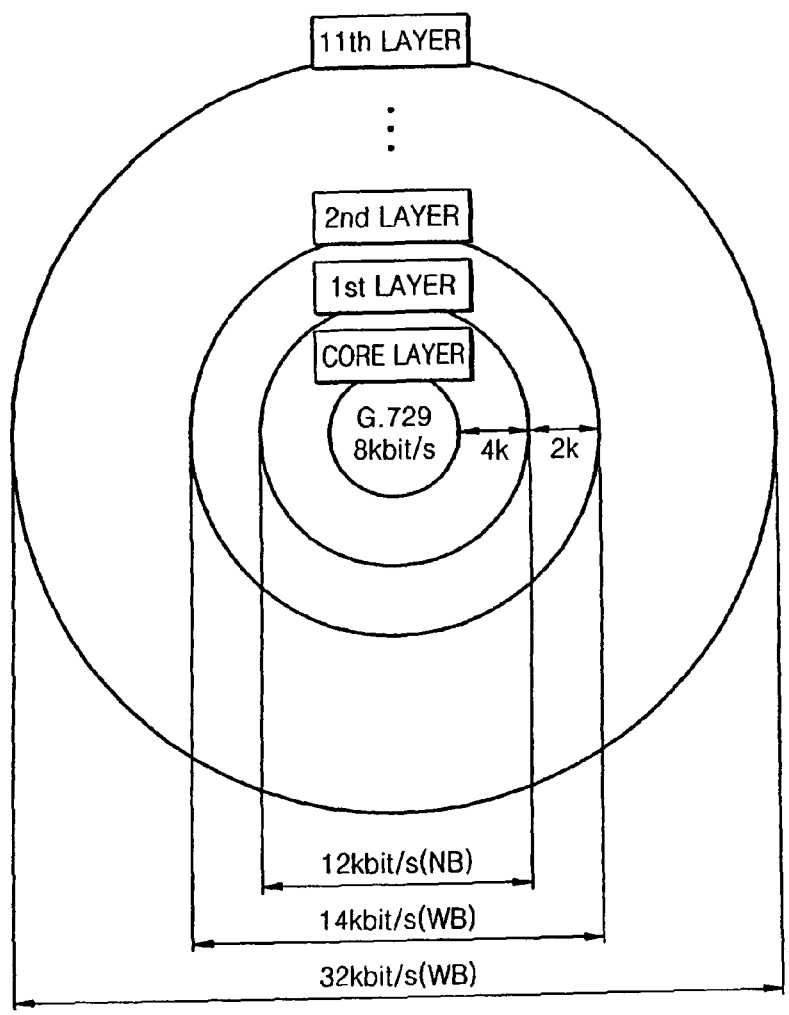
FIGS. 1A and 1B are schematic diagrams illustrating a layered structure of a data section of a conventional bitstream in the G.729EV standard.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, an encoder and decoder of a scalable codec and encoding and decoding methods for use in the scalable codec according to embodiments of the present invention will be described in detail with reference to the attached drawings.

Figure 2:
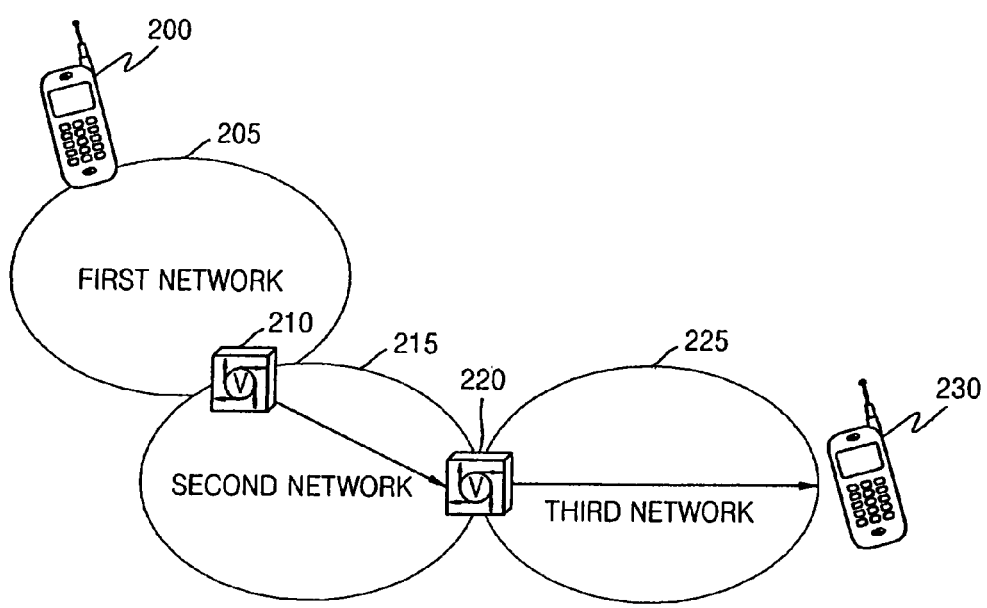
FIG. 2 is a schematic diagram illustrating a scalable codec system including an encoder and decoder to encode an input signal into a scalable codec and to decode the scalable codec, and encoding and decoding methods thereof using the scalable codec according to an embodiment of the present general inventive concept.

FIG. 2 is a schematic diagram illustrating a scalable codec system including an encoder and decoder to encode one or more an input signal into a scalable codec and to decode the scalable codec, and encoding and decoding methods thereof using the scalable codec according to an embodiment of the present general inventive concept.

A first terminal 200 encodes input signals, receives an RTP (real-time protocol) control protocol (RTCP or real time control protocol) to monitor the quality of an RTP session, and estimates a network status according to the RTCP. The first terminal 200 determines a top coding bit rate to encode the input signals depending on estimation of a status of a network, generates a bitstream by encoding the input signals into a layered structure as a scalable codec, and outputs the bitstream. The top coding bit rate corresponds to a bit rate of a highest layer among a number of layers, and lower layers than the highest layer in the number of the layers have lower coding bit rates than the top bit rate. In this case, the first terminal 200 may also truncate one or more first lower layers from a data section of the bitstream according to a degree of traffic congestion in a first network 205 and transmit a first bitstream having only first remaining higher layers in the data section through the first network 205. Accordingly, the data section of the first bitstream does may not include the one or more first lower layers but includes the first remaining higher layers.

The top coding bit rate corresponds to a bit rate of a highest layer among a number of layers, and lower layers than the highest layer in the number of the layers have lower coding bit rates than the top bit rate. Accordingly, the bit rate of the highest layer in the data section of the bitstream may vary according to the top coding bit rate.

The first bitstream transmitted from the first terminal 200 may pass through the first bitstream truncation module 210, which may also truncate one or more second lower layers from the first remaining higher layers of the data section of the first bitstream depending on a degree of traffic congestion in a second network 215 and transmit a second bitstream having only second remaining higher layers in the data section through the second network 215. The data section of the second bitstream does not include the one or more first lower layers and the one or more second lower layers, but includes the second remaining higher layers. Here, the data section includes a core layer as a minimum set of data required to produce a minimum quality. The data section includes the first, second, and third lower layers and the third high layers as enhancement layers to enhance quality of the core layer.

The second bitstream transmitted from the first bitstream truncation module 210 may pass through a second bitstream truncation module 220, which may also truncate one or more third lower layers from the second remaining higher layers of the data section of the second bitstream depending on a degree of traffic congestion in a third network 225 and transmit a third bitstream having only third remaining higher layers in the data section through the third network 225. The data section of the third bitstream does not include the one or more first lower layers, the one or more second lower layers, and the one or more third lower layers, but includes the third remaining higher layers. Here, the one or more second lower layers are higher than the one or more first lower layers, and the one or more third lower layers are higher than the one or more second lower layers.

A second terminal 230 may decode a bitstream transmitted from an encoder, for example, at least one of the first terminal 230 and the first and second bitstream truncation modules 210 and 220 into original signals. The second terminal 230 receives the bitstream encoded into a scalable codec having a layered structure from the second bitstream truncation module 220, and decodes the bitstream according to the top coding bit rate used in the first terminal 200. Although amplitudes of the bitstream output from the first and second terminals 200 and 230 may be equal to each other, since one or more lower layers are truncated from the bitstream by the first and second bitstream truncation modules 210 and 220, an amplitude of the bitstream output from the second terminal 230 may be smaller than that from the first terminal 200.

Figure 3:
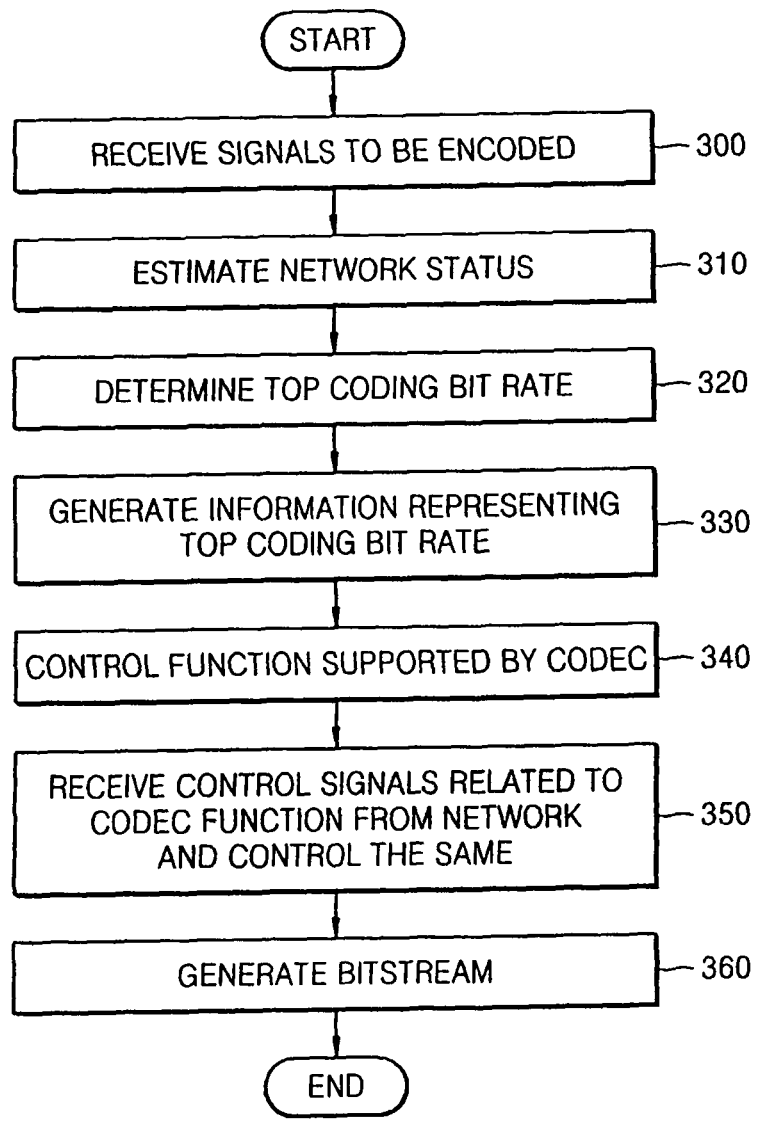
FIG. 3 is a flowchart illustrating an encoding method of encoding an input signal into a scalable codec according to an embodiment of the present general inventive concept.

FIG. 3 is a flowchart illustrating an encoding method of encoding one or more input signal into a scalable codec according to an embodiment of the present general inventive concept.

First, one or more target signals to be encoded are received (operation 300). Examples of the target signals include a speech signal, a music signal, an audio signal, an image signal, a video signal, a physiological signal, and the like.

Next, a status of each network is estimated (operation 310). Examples of the network status include a transfer rate in each network, a transfer rate at a bottleneck, a degree of traffic congestion with respect to data transmission, and the like. In operation 310, the network status can be estimated using the RTCP to monitor the quality of an RTP session.

A top coding bit rate for encoding is determined depending on the network status estimated in operation 310 (operation 320).

Information representing the top coding bit rate determined in operation 320 is generated (operation 330). The information generated in operation 330 is a syntax representing the top coding bit rate to be included in a header of a bitstream which will be generated in operation 360.

Encoders, such as terminals or media gateways, control functions supported by a codec (operation 340). Examples of the functions supported by the codec include an ON/OFF decision of various standardized pre-processings, an ON/OFF decision of various tools, a usage control of information regarding input signal characteristics, such as a sampling rate or number of channels, tools capable of adjusting the functions of the codec independent of standardization, and the like.

Control signals related to the functions of the codec are received from one or more networks, and an encoding process or at least one of the functions is controlled according to the control signals (operation 350). The control signals received in operation 350 include signals to control the functions of the codec related to channel control and delay information. The signals may not include the top coding bit rate.

The target signals received in operation 300 are encoded and a bitstream is generated (operation 360).

Figure 1B:
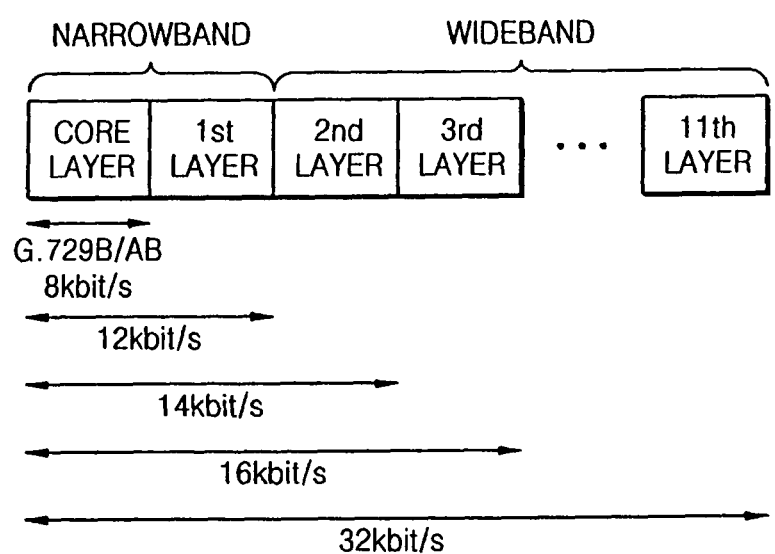
Figure 1C:
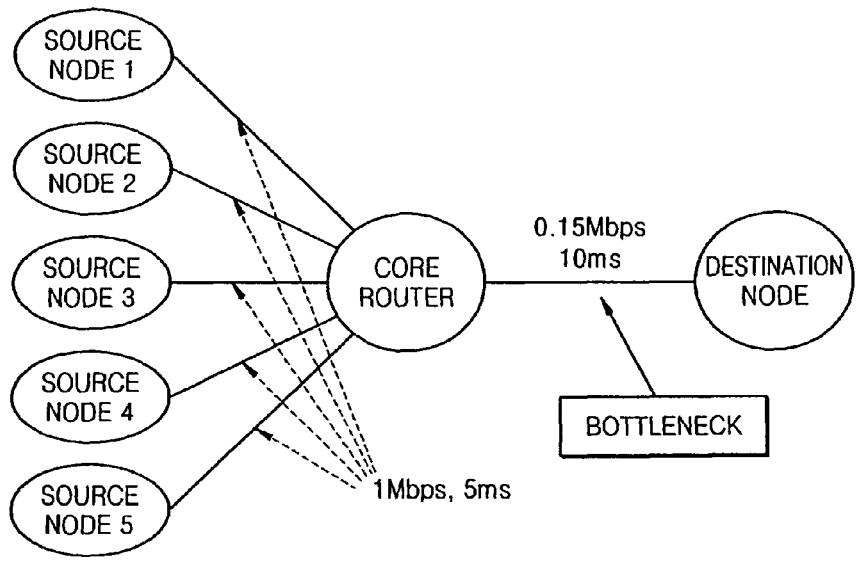
FIGS. 1C to 1E are diagrams illustrating a case where a bottleneck occurs on a network due to an increased traffic on the network.
Figure 1D:
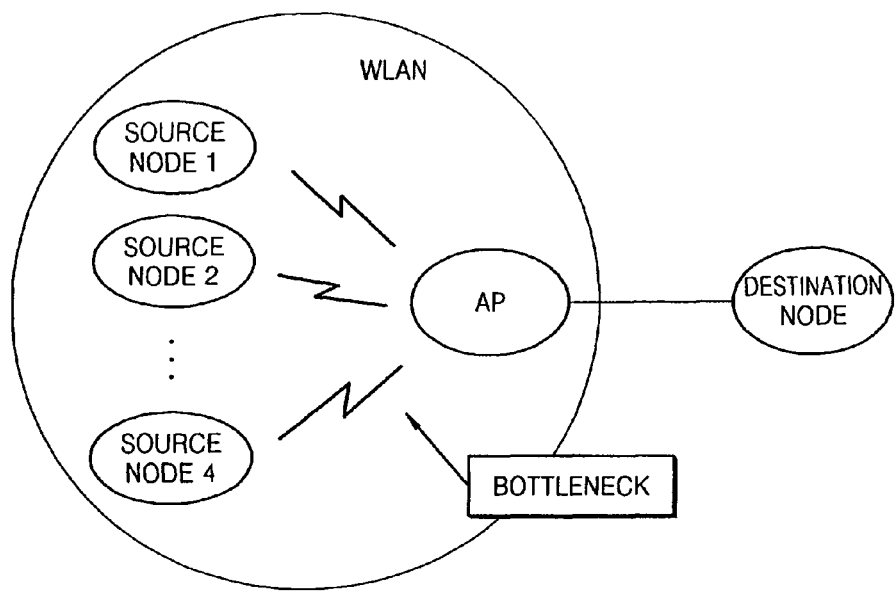
Figure 1E:
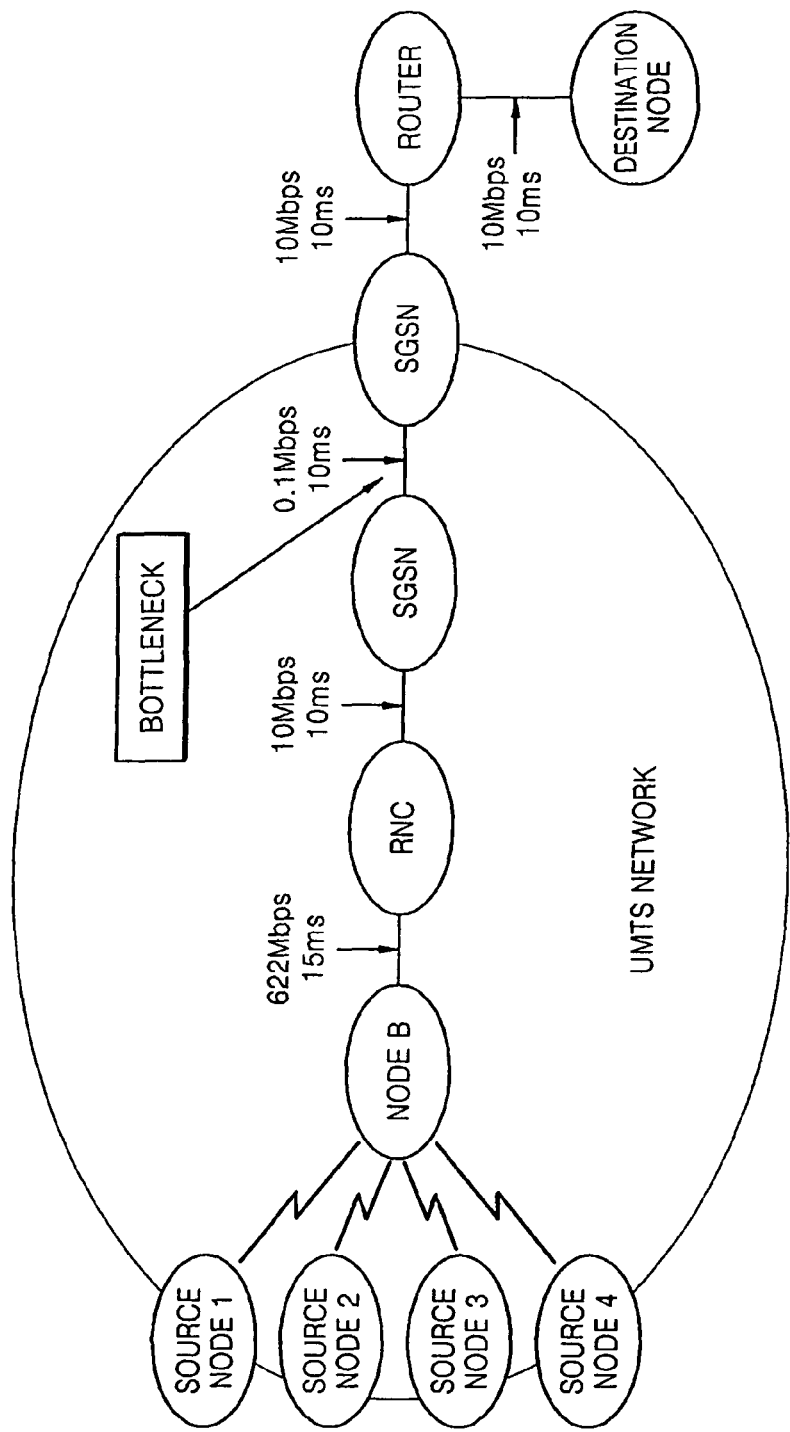

In operation 360, the target signals are encoded into a layered structure using, for example, the G.729EV standard or the BSAC scheme illustrated in FIGS. 1A and 1B to generate a data section of the bitstream. For example, as illustrated in FIG. 8, the data section of the bitstream is encoded into n-layers and only the remaining higher layers are transmitted by truncating one or more lower layers from the n-layers using a bitstream truncation module in terminals or networks as occasion demands.

Figure 7A:
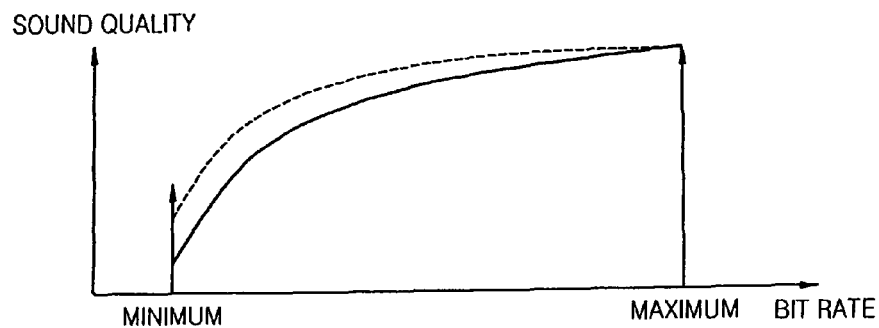
FIGS. 7A to 7C are graphs illustrating a case where encoding is performed at a top coding bit rate according to the encoding method of FIG. 3 or the encoder of FIG. 4.
Figure 7B:
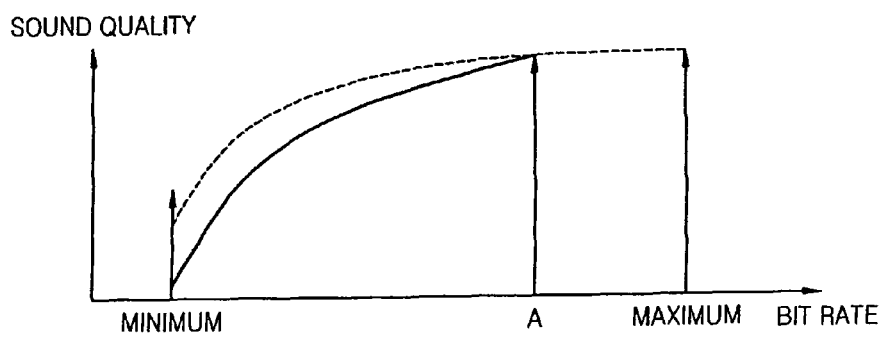
Figure 7C:
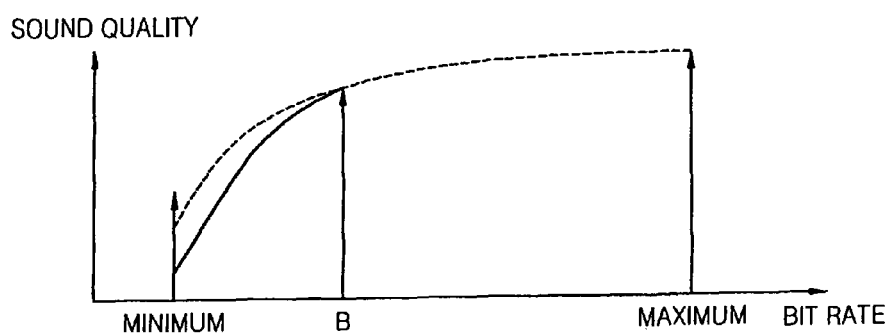

When the target signals are encoded into the layered structure in operation 360, the target signals are encoded at the top coding bit rate determined in operation 320. FIGS. 7A to 7C are graphs illustrating a case where encoding is performed according to a top coding bit rate determined in operation 320. In the graphs of FIGS. 7A to 7C, dotted lines represent traces for a multi-rate codec, and solid lines represent traces for a scalable codec generated in operation 360. For example, when the top coding bit rate determined in operation 320 is same as the initially set top coding bit rate, the target signal is encoded into the traces of the solid line illustrated in FIG. 7A. When the top coding bit rate is determined as 'A' in operation 320, the target signal is encoded into the traces of the solid line illustrated in FIG. 7B. When the top coding bit rate is determined as 'B' in operation 320, the target signal is encoded into the traces of the solid line illustrated in FIG. 7C.

Figure 8:
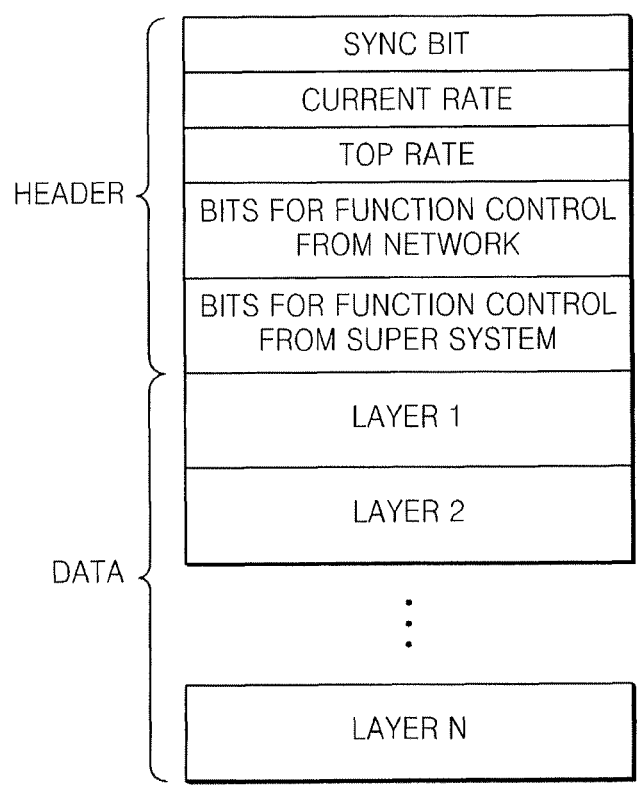
FIG. 8 is a schematic diagram illustrating an exemplary structure of a bitstream generated by the encoding method of FIG. 3 or the encoder of FIG. 4 according to an embodiment of the present general inventive concept.

The bitstream generated in operation 360 has a structure illustrated in FIG. 8. The bitstream is constituted by a header section and a data section. The header section includes 'Sync bit' for synchronization of the bitstream, 'Current rate' representing a current data transfer rate, 'Top rate' corresponding to the top coding bit rate generated in operation 330, and 'Bit for Function control from Network' representing instructions requested from the network. The data section constituted by n-layers 1 . . . N includes encoded bits. Here, the layer 1 may be a lowest layer and the layer N may be a highest layer. The data section may also include a core layer (not shown). The layers 1 . . . N are used to enhance quality of a signal of the core layer. The core layer may be included in a separate position of the bitstream other than the data section.

Figure 4:
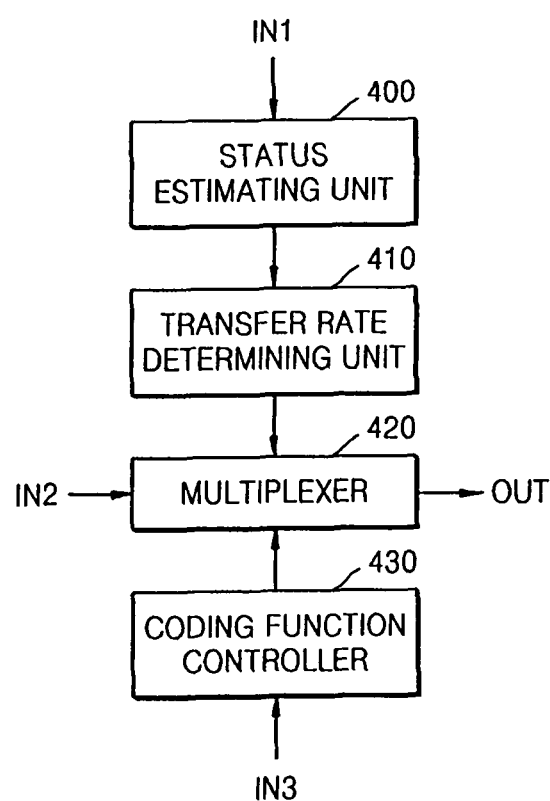
FIG. 4 is a block diagram illustrating an encoder to encode an input signal into a scalable codec according to an embodiment of the present general inventive concept.

FIG. 4 is a block diagram illustrating an encoder to encode an input signal into a scalable codec according to an embodiment of the present general inventive concept. The encoder includes a status estimating unit 400, a transfer rate determining unit 410, a multiplexer 420, and a coding function controller 430.

The status estimating unit 400 estimates a network status. Examples of the network status include a transfer rate in each network, a transfer rate at a bottleneck, a degree of traffic congestion with respect to data transmission, and the like. The status estimating unit 400 receives an RTCP enabling to monitor the quality of an RTP session through an input terminal IN1 and estimates the network status on the basis of the RTCP.

The transfer rate determining unit 410 determines a top coding bit rate for encoding depending on the network status estimated by the status estimating unit 400.

The coding function controller 430 controls functions supported by the scalable codec or functions to generate and process the scalable codec. Examples of the functions supported by the scalable codec include an ON/OFF decision of various standardized pre-processings, an ON/OFF decision of various tools, a usage control of information regarding input signal characteristics, such as a sampling rate or number of channels, tools capable of adjusting function of the codec regardless of standardization, and the like in order to encode an input signal into the scalable codec or decode the scalable codec.

In addition, the coding function controller 430 receives control signals related to the functions of the scalable codec from the networks through an input terminal IN3 and controls an encoding process according to the control signals. The control signals received in the coding function controller 430 are the signals controlling the function of the scalable codec related to channel control and delay information. The control signal may not include the top coding bit rate.

The multiplexer 420 encodes target signals received through an input terminal IN2, generates a bitstream, and outputs the bitstream through an output terminal OUT. Examples of the target signals include a speech signal, a music signal, an audio signal, an image signal, a video signal, a physiological signal, and the like.

In the multiplexer 420, the target signals are encoded into a layered structure according to, for example, the G.729EV standard or the BSAC scheme as illustrated in FIGS. 1A and 1B to generate a data section of the bitstream. For example, as illustrated in FIG. 8, the data section of the bitstream is encoded into n-layers and only the remaining higher layers are transmitted by truncating one or more lower layers from the n-layers using a bitstream truncation module in terminals or networks as occasion demands.

When the target signals are encoded into the layered structure by the multiplexer 420, the multiplexer 420 encodes the target signals at the top coding bit rate determined by the transfer rate determining unit 410. As described above, graphs of FIGS. 7A to 7C illustrate cases where encoding is performed at different top coding bit rates determined in operation 320. Accordingly, a coding bit rate of the highest layer of the layered structure may not be constant but may vary according to the determined top coding bit rate.

The multiplexer 420 generates a syntax representing the top coding bit rate determined by the transfer rate determining unit 410 and inserts the syntax into the header section of the bitstream. 'Top rate' illustrated in FIG. 8 is an example of the syntax representing the top coding bit rate.

The bitstream generated by the multiplexer 420 has the structure illustrated in FIG. 8. The bitstream is constituted by a header section and a data section. The header section includes 'Sync bit' for synchronization of the bitstream, 'Current rate' representing current data transfer rate, 'Top rate' corresponding to the top coding bit rate generated in operation 330, and 'Bit for Function control from Network' representing instructions requested from the network. The data section is encoded bits and is constituted by n-layers.

According to the present general inventive concept, if the respective layers of an original (or initially set) layered structure encoded when the top coding bit rate is the same as an initially set top coding bit rate (original top coding bit rate) as illustrated in FIG. 7A, have their own fixed rates, and the number of the layers of the layered structure encoded according to a determined top coding bit rate is variable compared to the fixed number of the layers of the original (or initially set) layered structure, the number of layers of the layered structure encoded according to a first top coding bit rate is smaller than the number of layers of the layered structure encoded according to a second top coding bit rate which is greater than the first top coding bit rate. That is, the number of the layers according to the top coding bit rate A of FIG. 7B is less than that of the layers according to the initially set top coding bit rate of FIG. 7A. In addition, the number of the layers according to the top coding bit rate B of FIG. 7C is less than the number of layers according to the top coding bit rate A of FIG. 7B.

If the number of the layers of the layered structure encoded according to the top coding bit rate is not variable but is constant, the coding bit rates of the respective layers may vary. In this case, that is, the coding bit rates of the respective layers may be determined according to the determined top coding bit rate.

Figure 5:
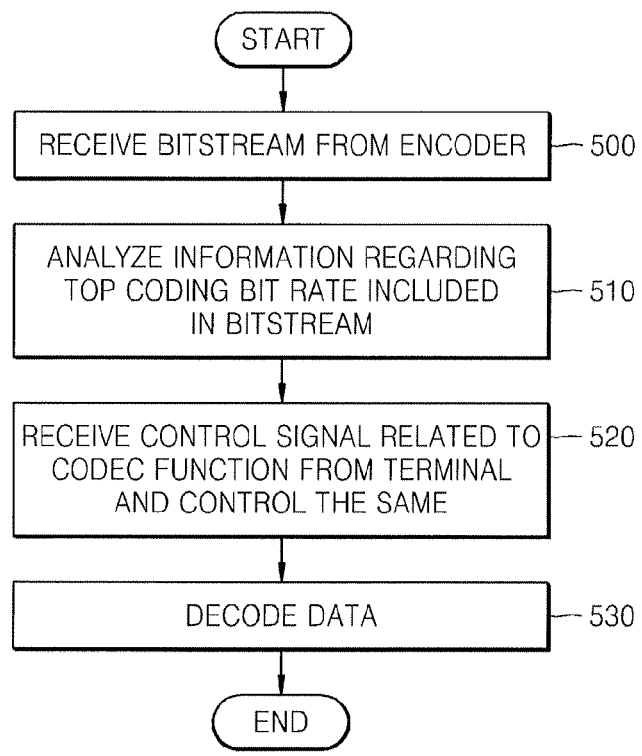
FIG. 5 is a flowchart illustrating a decoding method of decoding a scalable codec according to an embodiment of the present general inventive concept.

FIG. 5 is a flowchart illustrating a decoding method of decoding a scalable codec according to an embodiment of the present general inventive concept.

Referring to FIGS. 4 and 5, a bitstream output from the encoder is received (operation 500). The bitstream is constituted by signals obtained by encoding a speech signal, a music signal, an audio signal, an image signal, a video signal, a physiological signal, and the like.

A data section of the bitstream received in operation 500 is constituted by signals encoded into a layered structure according to, for example, the G.729EV standard or the BSAC scheme as illustrated in FIGS. 1A and 1B. For example, as illustrated in FIG. 8, the data section of the bitstream is encoded into n-layers and only the remaining higher layers are transmitted by truncating one or more lower layers from the n-layers using a bitstream truncation module in terminals or networks as occasion demands. Although an amplitude of the bitstream output from the encoder may be equal to that of the bitstream received in operation 500, since the one or more lower layers are truncated from the bitstream by the bitstream truncation module, the amplitude of the bitstream output from the encoder may be smaller than that of the bitstream received in operation 500. When one or more portions of the layers are truncated from the data section of the bitstream, the syntax representing the current bit rate is modified to 'Current rate' as illustrated in FIG. 8.

The top coding bit rate included in the bitstream received in operation 500 are analyzed (operation 510). In operation 510, information regarding the top coding bit rate is analyzed by reading a syntax representing the top coding bit rate, such as 'Top rate' illustrated in FIG. 8, provided in the header section of the bitstream received in operation 500.

Control signals related to the functions of the scalable codec are received from the networks and the control signals are used to control an encoding process of the scalable codec (operation 520). Examples of the functions supported by the codec include an ON/OFF decision of various standardized pre-processings, an ON/OFF decision of various tools, a usage control of information regarding input signal characteristics, such as a sampling rate or number of channels, tools capable of adjusting function of the codec regardless of standardization, and the like.

The data section illustrated in FIG. 8 is decoded using the top coding bit rate analyzed in operation 510 (operation 530).

Figure 6:
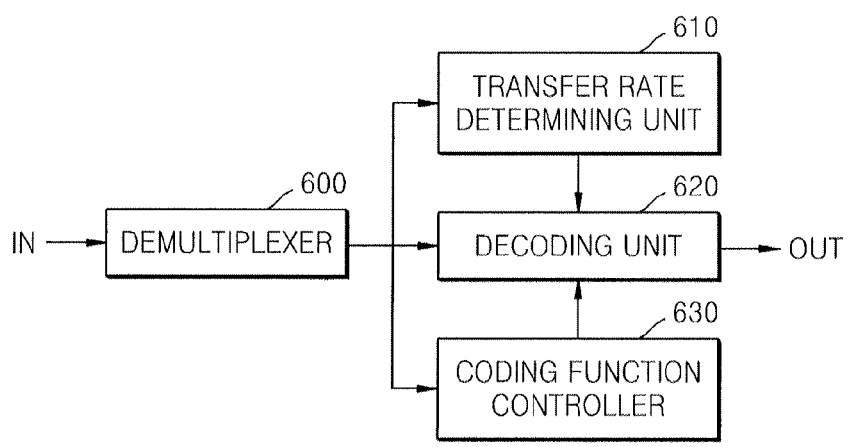
FIG. 6 is a block diagram illustrating a decoder to decode a scalable codec according to an embodiment of the present general inventive concept.

FIG. 6 is a block diagram illustrating a decoder to decode a scalable codec according to an embodiment of the present general inventive concept. The decoder includes a demultiplexer 600, a transfer rate analyzing unit 610, a coding function controller 620, and a decoding unit 630.

Referring to FIGS. 5 and 6, the demultiplexer 600 receives a bitstream from an encoder through an input terminal IN and analyzes the bitstream. The bitstream received in the demultiplexer 600 is constituted by signals obtained by encoding a speech signal, a music signal, an audio signal, an image signal, a video signal, a physiological signal, and the like.

The data section of the bitstream received in the demultiplexer 600 is constituted by signals encoded into a layered structure according to the G.729EV standard or the BSAC scheme as illustrated in FIGS. 1A and 1B. For example, as illustrated in FIG. 8, the data section of the bitstream is encoded into n-layers and only the remaining higher layers are transmitted by truncating some lower layers from the n-layers using a bitstream truncation module in terminals or networks as occasion demands. Although an amplitude of the bitstream output from the encoder may be equal to that of the bitstream received in the demultiplexer 600, since one or more lower layers are truncated from the bitstream by the bitstream truncation module, the amplitude of the bitstream output from the encoder may be smaller than that of the bitstream received in the demultiplexer 600. When some portions of the layers are truncated from the data section of the bitstream, the syntax representing the current bit rate is modified to 'Current rate' as illustrated in FIG. 8.

The transfer rate analyzing unit 610 analyzes the top coding bit rate included in the bitstream received in the demultiplexer 600. In this case, the transfer rate analyzing unit 610 analyzes information regarding the top coding bit rate by reading a syntax representing the top coding bit rate, such as 'Top rate' illustrated in FIG. 8, provided in the header section of the bitstream received in the demultiplexer 600.

The coding function controller 620 receives control signals related to the functions of the scalable codec from the networks and controls a decoding process to decode the scalable codec according to the control signals. Examples of the functions supported by the scalable codec include an ON/OFF decision of various standardized pre-processings, an ON/OFF decision of various tools, a usage control of information regarding input signal characteristics, such as a sampling rate or number of channels, tools capable of adjusting function of the codec regardless of standardization, and the like.

The decoding unit 630 decodes the data section of FIG. 8 using the top coding bit rate analyzed in the transfer rate analyzing unit 610 and outputs the decoded data section through an output terminal OUT.

The process described above can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices.

As described above, according to the encoder and decoder of a scalable codec and the encoding and decoding methods using the scalable codec of the present general inventive concept, the top coding bit rate for encoding the input signals are changed according to the network status and the bitstream is decoded by analyzing the top coding bit rate included in the bitstream.

According to the present general inventive concept, it is possible to adaptively perform the encoding operation depending on the network status and hence perform the encoding and decoding operations efficiently. In addition, since the encoding operation is performed in consideration of the network characteristic, it is possible to optimize the operation of the scalable codec.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of encoding an input signal, the method comprising:
   estimating a status of a network;
   determining a coding bit rate to encode the input signal according to the estimated network status; and
   encoding, by at least one processing device, the input signal according to the determined coding bit rate;

encoding the determined coding bit rate; and
generating a bitstream including the encoded coding bit rate as well as the encoded input signal,
wherein the coding bit rate is related to a transmission bitrate.

2. The method according to claim 1, wherein the encoding of the input signal comprises:
generating a syntax representing the determined coding bit rate; and
encoding the input signal according to the determined coding bit rate to generate the bitstream including the syntax.

3. The method according to claim 2, wherein the encoding of the input signal comprises truncating one or more layers of the bitstream in a network.

4. The method according to claim 1, wherein the determining of the coding bit rate is performed in a network or a terminal.

5. A method of encoding an input signal, the method comprising:
estimating a status of a network;
determining a coding bit rate to encode the input signal using the estimated network status; and
encoding, by at least one processing device, the input signal according to the determined coding bit rate;
encoding the determined coding bit rate; and
generating a bitstream including information on the encoded coding bit rate as well as the encoded input signal.

6. The method according to claim 5, wherein the determining of the coding bit rate comprises determining the coding bit rate in the network or a terminal.

7. The method according to claim 5, wherein the encoding of the input signal comprises truncating one or more layers of a scalable bitstream in the network.

8. A method of decoding a bitstream including information on a coding bit rate determined according to a network status, the method comprising:
obtaining an encoded coding bit rate from the bitstream; and
decoding, by at least one processing device, the bitstream according to the obtained coding bit rate,
wherein the coding bit rate is related to a transmission bitrate.

9. The method according to claim 8, wherein the coding bit rate is determined in a network or a terminal.

10. The method according to claim 8, wherein the bitstream comprises one or more layers truncated in a network.

11. A non-transitory computer readable recording medium having recorded thereon a program for executing a method of encoding an input signal, the method comprising:
estimating a status of a network;
determining a coding bit rate to encode the input signal according to the estimated network status; and
encoding the input signal according to the determined coding bit rate, encoding the determined coding bit rate and generating the bitstream including the encoded determined coding bit rate as well as the encoded input signal.

12. A non-transitory computer readable recording medium having recorded thereon a program for executing a method of encoding an input signal, the method comprising:
estimating a status of a network;
determining a coding bit rate to encode the input signal using the estimated network status; and
encoding the input signal according to the determined coding bit rate, encoding the determined coding bit rate and generating the bitstream including information on the encoded coding bit rate as well as the encoded input signal,
wherein the coding bit rate is related to a transmission bitrate.

13. A non-transitory computer readable recording medium having recorded thereon a program for executing a method of decoding a bitstream including information on a coding bit rate determined according to a network status, the method comprising:
obtaining an encoded coding bit rate from the bitstream; and
decoding the bitstream according to the obtained coding bit rate,
wherein the coding bit rate is related to a transmission bitrate.

14. An encoder to encode an input signal, the encoder comprising:
an estimating unit, implemented by at least one processing device, to estimate a status of a network;
a transfer rate determining unit implemented by the at least one processing device, to determine a coding bit rate to encode the input signal using the estimated network status; and
an encoding unit, implemented by the at least one processing device, to encode the input signal according to the determined coding bit rate, to encode the determined coding bit rate and to generate a bitstream including information on the encoded coding bit rate as well as the encoded input signal.

15. The encoder according to claim 14, wherein the encoding unit comprises:
a generating unit, implemented by the at least one processing device, to generate a syntax representing the determined coding bit rate; and
a bitstream generating unit, implemented by the at least one processing device, to encode the input signal according to the determined coding bit rate to generate the bitstream including the syntax.

16. The encoder according to claim 14, wherein the transfer rate determining unit determines the coding bit rate in a network or a terminal.

17. The encoder according to claim 15, wherein the bitstream comprises one or more layers truncated in the network.

18. An encoder to encode an input signal, the encoder comprising:
a status estimating unit, implemented by at least one processing device, to estimate a status of a network;
a determining unit, implemented by the at least one processing device, to determine a coding bit rate to encode the input signal using the estimated network status; and
a bitstream generating unit, implemented by the at least one processing device, to encode the input signal according to the determined coding bit rate, to encode the determined coding bit rate and to generate a bitstream including a syntax of the encoded coding bit rate as well as the encoded input signal,
wherein the coding bit rate is related to a transmission bitrate.

19. The encoder according to claim 18, wherein the determining unit determines the coding bit rate in the network or a terminal.

20. The encoder according to claim 18, wherein the bitstream comprises one or more layers truncated in the network.

21. A decoder to decode a bitstream including information on a coding bit rate determined according to a network status, the decoder comprising:

an analyzing unit, implemented by the least one processing device, to obtain an encoded coding bit rate from the bitstream; and a decoding unit, implemented by the at least one processing device, to decode the bitstream according to the obtained coding bit rate, wherein the coding bit rate is related to a transmission bitrate.

22. The decoder according to claim 21, wherein the coding bit rate is determined in a network or a terminal.

23. The decoder according to claim 21, wherein the bitstream comprises one or more layers truncated in a network.

24. An encoding and decoding system comprising:

an encoder, implemented by at least one processing device, to estimate a status of a network, to determine a coding bit rate to encode an input signal using the estimated network status, to encode the input signal according to the determined coding bit rate, to encode the determined coding bit rate and to generate a bitstream including information on the encoded coding bit rate as well as the input signal; and a decoder, implemented by at least one processing device, to obtain the coding bit rate from the bitstream, and to decode the bitstream according to the obtained coding bit rate, wherein the coding bit rate is related to a transmission bitrate.

25. The method according to claim 1, wherein the bitstream further comprises information representing a current data transfer rate.

26. The method according to claim 8, wherein the bitstream further comprises information representing a current data transfer rate.

27. The encoder according to claim 14, wherein the bitstream further comprises information representing a current data transfer rate.

28. The decoder according to claim 21, wherein the bitstream further comprises information representing a current data transfer rate.

* * * * *